(12) United States Patent
Albayrak et al.

(10) Patent No.: US 7,372,233 B2
(45) Date of Patent: May 13, 2008

(54) METHOD FOR OPERATION OF A CONVERTER CIRCUIT FOR A WASHING MACHINE OR A WASHER/DRIER, CONVERTER CIRCUIT, AND WASHING APPLIANCE OR WASHER/DRIER

(75) Inventors: Hasan Gökcer Albayrak, Berlin (DE); Lothar Knopp, Berlin (DE); Thomas Ludenia, Falkensee (DE); Jörg Skrippek, Priort (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/858,690

(22) Filed: Jun. 1, 2004

(65) Prior Publication Data

US 2005/0162120 A1 Jul. 28, 2005

Related U.S. Application Data

(63) Continuation of application No. PCT/EP03/14467, filed on Dec. 18, 2003.

(51) Int. Cl.
*H02P 3/18* (2006.01)
(52) U.S. Cl. .................. 318/812; 318/801; 318/814; 318/805
(58) Field of Classification Search .................. None
See application file for complete search history.

(56) References Cited

U.S. PATENT DOCUMENTS

| | | | | |
|---|---|---|---|---|
| 4,540,921 A | * | 9/1985 | Boyd et al. .................. 318/254 |
| 4,709,292 A | * | 11/1987 | Kuriyama et al. ............ 361/22 |
| 5,021,722 A | * | 6/1991 | Llerena et al. ............... 318/434 |
| 5,592,058 A | * | 1/1997 | Archer et al. ................ 318/254 |
| 6,215,261 B1 | * | 4/2001 | Becerra ....................... 318/254 |
| 6,586,898 B2 | * | 7/2003 | King et al. ................... 318/254 |
| 6,661,681 B2 | * | 12/2003 | Nakamura ................ 363/56.03 |
| 6,774,664 B2 | * | 8/2004 | Godbersen .................... 324/772 |
| 2005/0073279 A1 | * | 4/2005 | Fenley ......................... 318/717 |

* cited by examiner

*Primary Examiner*—Lincoln Donovan
*Assistant Examiner*—Renata McCloud
(74) *Attorney, Agent, or Firm*—Russell W. Warnock; James E. Howard (57) ABSTRACT

A method is provided for operating a converter circuit, in particular a pulse-width modulated frequency converter circuit having a DC voltage intermediate circuit, which controls two or more winding sections of a polyphase dynamo-electrical machine, in particular a three-phase asynchronous motor for a laundry appliance. The method determines one or more parameters of the dynamo-electrical machine, before a rotating field is produced in the dynamo-electrical machine by the converter circuit. The parameters can be used to deduce a variant of the dynamo-electrical machine, and to select open-loop and closed-loop control parameters which are associated with the variant. Likewise, the method allows possible machine faults to be determined by using the parameters. Likewise, a converter circuit and a laundry appliance perform the method and have a converter circuit for controlling a polyphase dynamo-electrical machine, which, in particular, drives a drum which is mounted in the laundry appliance such that it can rotate.

43 Claims, 3 Drawing Sheets

METHOD FOR OPERATION OF A CONVERTER CIRCUIT FOR A WASHING MACHINE OR A WASHER/DRIER, CONVERTER CIRCUIT, AND WASHING APPLIANCE OR WASHER/DRIER

CROSS-REFERENCE TO RELATED APPLICATION

This application is a continuation, under 35 U.S.C. § 120, of copending international application No. PCT/EP03/14467, filed Dec. 18, 2003, which designated the United States; the prior application is herewith incorporated by reference in its entirety.

BACKGROUND OF THE INVENTION

Field of the Invention

The invention relates to a method for operation of a converter circuit, in particular a pulse-width modulated frequency converter circuit having a DC voltage intermediate circuit that controls two or more winding sections of a polyphase dynamo-electrical machine, in particular a three-phase asynchronous motor for a laundry appliance. The method determines one or more parameters of the dynamo-electrical machine. Furthermore, the invention relates to a converter circuit for carrying out the method and to a laundry appliance having a converter circuit for controlling a polyphase dynamo-electrical machine that, in particular, drives a drum that is mounted in the laundry appliance such that it can rotate.

Converter circuits and methods for operation of a converter circuit that control a dynamo-electrical machine are known in numerous forms from the prior art. Converter circuits are used for conversion of an input-side single-phase or polyphase AC voltage to an output-side single-phase or polyphase AC voltage, whose frequency, number of phases and/or amplitude differ from the input-side AC voltage. Converter circuits that can convert the frequency of an AC voltage, so-called frequency converter circuits or frequency change circuits, can produce any desired voltage frequencies and/or voltage amplitudes on the output side. Frequency converter circuits are also used to control the rotation speed of dynamo-electrical machines, for example three-phase asynchronous motors. Asynchronous motors such as these require extremely little maintenance, have high power limits and can be operated with particularly little noise. Owing to these advantages, dynamo-electrical machines such as these whose rotation speed is regulated are also used in laundry appliances, such as domestic washing machines or domestic washer/driers. Machines such as these are used to drive, for example, a washing drum that is mounted in the laundry appliance such that it can rotate. In this case, pulse-width modulated frequency converter circuits are used, in particular, in order to control three-phase asynchronous motors. The components of frequency converter circuits such as these generally each include a mains filter, a DC voltage intermediate circuit, a power stage with a so-called driver stage, and a microcontroller or a digital signal processor. The components are generally combined in an assembly, in which case, for example, the mains filter may form a separate assembly. In addition to the components mentioned above, converter circuits for open-loop and/or closed-loop control of dynamo-electrical machines also use sensor elements for detection of the voltage, current, and/or temperature in the converter circuit, and/or devices for detection of parameters relating to the driven dynamo-electrical machine. The parameters may vary, particularly as a result of heating during operation of the machine. Sensor elements or devices such as these are in some cases integral assemblies within the converter circuit and are used for power-optimized operation of the dynamo-electrical machine. The detected currents, voltage, temperature value, and/or the machine parameters can be used in conjunction with individual calculation rules or complex mathematical machine models for the microcontroller or digital signal processor to determine closed-loop and/or open-loop control variables, which result in the machine being driven in a power-optimized manner in every operating state of the machine.

Known converter circuits may have a technically complex and costly construction and, in some cases, are susceptible to defects. Further devices are required for protection of the converter circuit and/or of the dynamo-electrical machine to disconnect the converter circuit during an overvoltage, an overtemperature, a short-circuit, a ground short, and/or a turns short in the frequency converter circuit and/or in the dynamo-electrical machine.

When using a dynamo-electrical machine with a converter circuit in a laundry appliance, in particular in a domestic washing machine or in a domestic washer/drier, the protective devices ensure compliance with the regulations of the international electrical standards that are applicable to a laundry appliance. In this case, even in the event of malfunctions and/or faults of individual components, such as the converter circuit and/or the dynamo-electrical machine in the laundry appliance, no hazards may result, for example as a result of excessive component heating, overcurrents, and line shorts for the operator of the laundry appliance. The protective devices that have been used in laundry appliances until now admittedly result in reliable compliance within the specified standards, but in some cases the protective devices are costly and do not ensure sufficient preventative protection against a component defect resulting in a repair to the laundry appliance.

SUMMARY OF THE INVENTION

It is accordingly an object of the invention to provide a method for operation of a converter circuit for a washing machine or a washer/drier, a converter circuit, and a washing appliance or washer/drier that overcome the hereinafore-mentioned disadvantages of the heretofore-known methods and devices of this general type and that provide a method for operating a converter circuit and a converter circuit to carry out a method. The converter circuit controls and/or regulates in particular a dynamo-electrical machine. In the dynamo-electrical machine, the parameters of the dynamo-electrical machine can be detected using simple and low-cost devices. These parameters allow power optimized open-loop and/or closed-loop control of the dynamo-electrical machine and/or preventative detection of malfunctions and faults in the converter circuit and/or in the dynamo-electrical machine.

With the foregoing and other objects in view, there is provided, in accordance with the invention, a method for operating a converter circuit controlling two or more winding sections of a polyphase dynamo-electrical machine while determining at least one parameter of the dynamo-electrical machine. The first step of the method includes producing, with a power stage in the converter circuit, at least one voltage pulse for driving a winding section of the dynamo-electrical machine, while not producing any rotating field in the dynamo-electrical machine with the at least one voltage pulse, and while producing the at least one voltage pulse before producing any other rotating field for the dynamo-electrical machine with the converter circuit. The next step is, while driving the dynamo-electrical machine, determining at least one parameter for the dynamo-electrical machine with a measurement device in the converter circuit in conjunction with at least one converter for detecting at least one of a current and a voltage, and a time detection device.

In other words, the converter circuit, which controls a polyphase dynamo-electrical machine having a number of winding sections, advantageously has a sequence controller. The sequence controller performs the method according to the invention. The method has the steps that at least one voltage pulse or a voltage pulse sequence is produced by a power stage in the converter circuit in order to drive at least one winding section. The voltage pulse or the voltage pulse sequence does not produce any rotating field in the dynamo-electrical machine. The winding section is driven before any other production of a rotating field for the dynamo-electrical machine by the converter circuit. At least one time and/or electrical parameter of the dynamo-electrical machine is determined by using a time, voltage, and/or current measurement device in the converter circuit while the dynamo-electrical machine is driven. Method steps such as these allow a time and/or electrical parameter of the machine to be determined before correct operation and respective driving of the dynamo-electrical machine, during which the converter circuit produces a rotating field in the dynamo-electrical machine. A power-optimum drive, which is matched to the respective instantaneous machine situation, can be advantageously produced preventatively based on a parameter such as this, before each occasion on which the dynamo-electrical machine is driven. Likewise, a malfunction and/or a fault in the components involved can be preventatively detected before the machine is driven.

In one advantageous development of the invention, the current that is formed in the power stage or in the respectively driven winding section of the dynamo-electrical machine is measured by using a current measurement device in the converter circuit while at least one winding section is being driven in a way that does not produce any rotating field in the dynamo-electrical machine. Furthermore, a time measurement device in the converter circuit is used to determine a time period that is required from the start of a drive such as this to reach a predetermined current value. A time period such as this is a time parameter of the dynamo-electrical machine and of the driven winding section of the dynamo-electrical machine. A time parameter such as this can be determined particularly easily by using a microcontroller or a digital signal processor, which is generally already a component of a converter circuit for open-loop and/or closed-loop control of the power stage. Therefore, there is no need for any further, costly components to determine a parameter of the dynamo-electrical machine.

According to a further advantageous development, the inductance of the driven winding section is determined in a further method step as a function of the time parameter. In this case, a determination process such as this can be performed particularly easily by using a microcontroller or by using a signal processor, using an appropriate association table, or by using a mathematical machine model. The inductance of the winding section represents an electrical parameter of the dynamo-electrical machine. In particular, the inductance influences the power output of the dynamo-electrical machine. Because the induction of a winding section of the dynamo-electrical machine is determined before the machine is driven in a way in which a rotating field is produced in the machine, the open-loop and closed-loop parameters can advantageously be adapted as a function of the induction before the machine is driven in this way. Optimum power utilization of the dynamo-electrical machine can thus be achieved for each drive for production of a rotating field. According to a further advantageous development of the invention, the electrical resistance of a winding section can be determined as a further electrical parameter of the dynamo-electrical machine. In this case, the development includes further steps for determination of a root mean square voltage and of a maximum current value that occur in the power stage of the converter circuit while at least one winding section of the dynamo-electrical machine is being driven, with a drive such as this not producing any rotating field in the dynamo-electrical machine. The root mean square voltage is determined by using a time and/or voltage measurement device in the converter circuit by measuring the times for which a voltage pulse that is produced or a voltage pulse sequence that is produced is switched on and/or off, and by measuring the amplitude of the voltage pulses. The current that is formed in the power stage is determined by using a current measurement device, and the time change in the current is determined by using a further device in the converter circuit. The maximum current is determined by using the current value that occurs when the current value is no longer changed, or the time change in the current is below a predetermined limit value. The electrical resistance of the driven winding section is then obtained from the root mean square voltage and the maximum current value. This developed method can also be implemented using simple devices, which are generally available in any case, in the converter circuit. This is particularly true if the converter circuit has a microcontroller or a signal processor.

A further refinement of the invention is to compare at least one of the time and/or electrical parameters of the dynamo-electrical machine with a number of predetermined parameter values, which are associated with different variants of the dynamo-electrical machine. The variant of the dynamo-electrical machine is determined based on the comparison. Furthermore, open-loop and closed-loop control parameters that are associated with the variant are selected from a set of open-loop and closed-loop control parameters for various variants of the dynamo-electrical machine. This is particularly advantageous because this makes it possible to use a converter circuit such as this for different variants of the dynamo-electrical machine, with specific open-loop and closed-loop control parameters being used for open-loop and/or closed-loop control of each of the variants. Each variant of the dynamo-electrical machine can thus be driven on a power-optimum basis by only one converter circuit.

A further advantageous development of the invention includes further steps, in which a time and/or electrical parameter of the dynamo-electrical machine is compared by using a suitable comparison device in the converter circuit with a tolerance value band that is associated with the respective parameter, thus making it possible to deduce that there is a fault in the dynamo-electrical machine and/or in the converter circuit. The fault is present when one of the time and/or electrical parameters is outside the respective tolerance value band. This development can be implemented particularly easily in a converter circuit having a microcontroller or having a signal processor since, in a situation such as this, no additional components are required to implement the development in the converter circuit. Because the fault is determined before the dynamo-electrical machine is driven to produce a rotating field in the machine, the device in the converter circuit advantageously makes it possible to prevent damage to or total failure of the converter circuit and/or the dynamo-electrical machine.

In a further development, the method according to the invention advantageously includes a step in which the outputting of a voltage pulse sequence from the power stage in the converter circuit for producing a rotating field in the dynamo-electrical machine is prevented by using a disconnection device in the converter circuit when a fault is present. This development is particularly advantageous because this development effectively and reliably avoids failure of individual components in the converter circuit and/or in the dynamo-electrical machine.

A further refinement of the invention includes a voltage pulse sequence being determined in a further step as a function of a time and/or electrical parameter, with the voltage pulse sequence being used by the power stage in the converter circuit to form a rotating field in the dynamo-electrical machine. This special refinement allows a drive that is matched to the instantaneous operating state and whose power is optimized to be produced very easily for operation of a dynamo-electrical machine. This is particularly the case when the time and/or electrical parameters can vary during correct operation of the dynamo-electrical machine. Particularly in the case of converter circuits, the voltage pulse sequence can advantageously be determined by using a microcontroller or a signal processor on the basis of an association table and/or a mathematical machine model, taking into account the time and/or electrical parameters. It is particularly advantageous to take account of the inductance of one or more winding sections as an electrical parameter, because the power output of a dynamo-electrical machine depends significantly on the inductance.

In a further refinement of the method according to the invention, a voltage pulse sequence for operation of the dynamo-electrical machine is determined as a function of a predetermined operating temperature value. This therefore also advantageously accounts for predetermined and known operating conditions for the power-optimum drive. Furthermore, this makes it particularly simple to ensure compliance with permissible operating temperatures that, inter alia, are specified in order to comply with international standards. In this specific refinement as well, the voltage pulse sequence is preferably determined using an appropriate association table and/or a mathematical machine model, which are/is components/a component of a microcontroller or of a signal processor in the converter circuit. Thus, no costly components are required in the converter circuit and/or in the dynamo-electrical machine even when using this development.

In order to carry out the method according to the invention, a converter circuit having a power stage that is used for production of voltage pulses and for driving a polyphase dynamo-electrical machine, and having devices for determination of at least one time and/or electrical parameter of the dynamo-electrical machine advantageously contains a sequence controller. The sequence controller controls the method according to the invention and/or the developments. The devices in the converter circuit that are required for controlling the method according to the invention and for determination of the time and/or parameters are simple and cost little, and can easily be integrated in the converter circuit. The converter circuit can thus be produced at particularly low cost.

In a further refinement of the invention, a laundry appliance, in particular a domestic washing machine or a converter circuit of the type described above for controlling a polyphase dynamo-electrical machine and which, in particular, drives a drum that is mounted in the laundry appliance such that it can rotate. A laundry appliance can thus advantageously be equipped at low cost with a converter circuit for driving the drum, taking account of compliance with the regulations in the international electrical Standards.

Other features that are considered as characteristic for the invention are set forth in the appended claims.

Although the invention is illustrated and described herein as embodied in a method for operation of a converter circuit for a washing machine or a washer/drier, a converter circuit, and a washing appliance or washer/drier, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
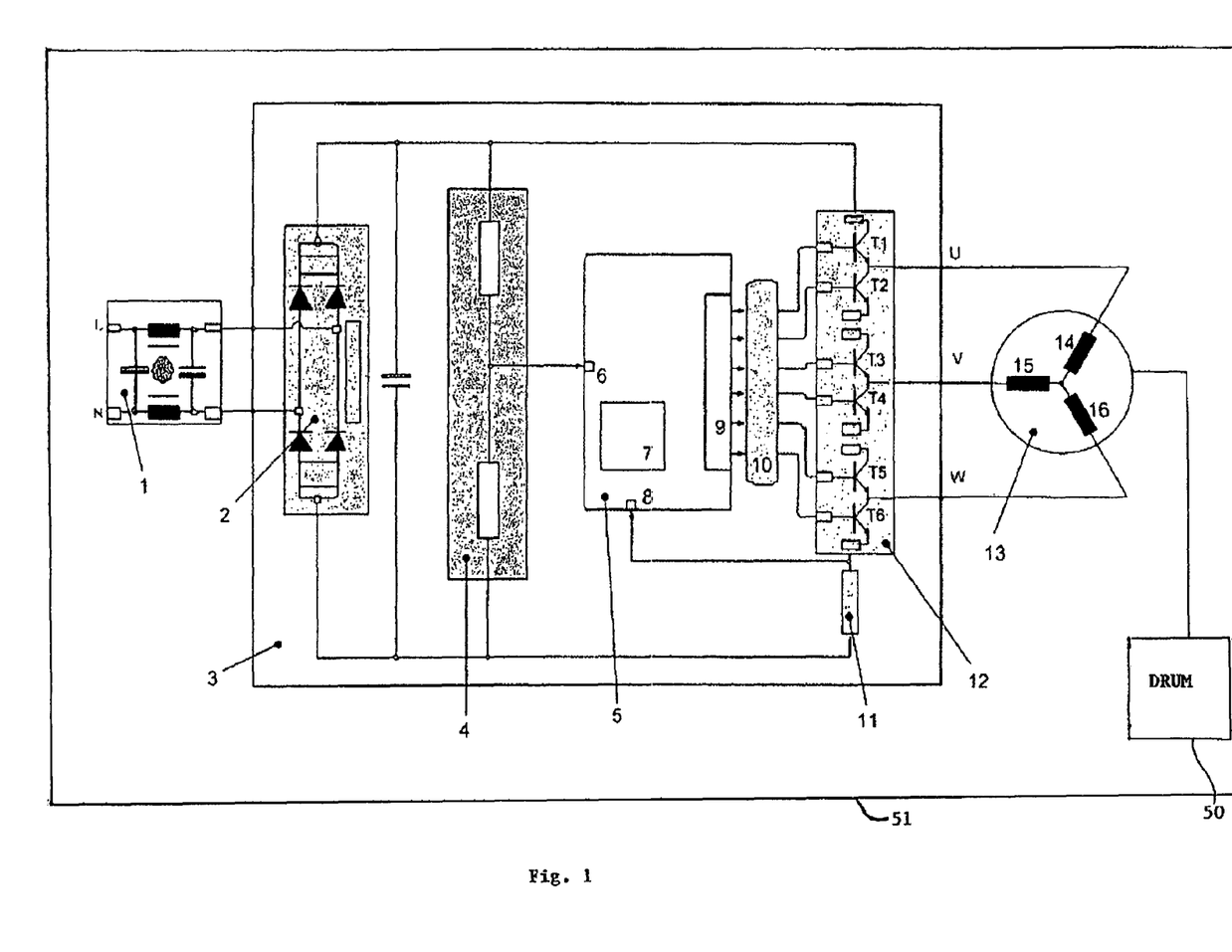
FIG. 1 is a schematic diagram showing a converter circuit, of a mains filter and of a dynamo-electrical machine according to the invention.

Referring now to the figures of the drawings in detail and first, particularly to FIG. 1 thereof, there is shown a block diagram of a converter circuit 3 that is used for driving a polyphase dynamo-electrical machine 13. In the embodiment shown, the converter circuit is in the form of a frequency converter circuit 3 and the dynamo-electrical machine 13 is in the form of a three-phase asynchronous motor. In the description of the exemplary embodiment in the following text, the converter circuit 3 is referred to as the frequency converter circuit 3, and the dynamo-electrical machine 13 is referred to as the asynchronous motor 13. However, the invention is not restricted to a specific embodiment such as this, and the converter circuit 3 and the dynamo-electrical machine may also be of different types.

The asynchronous machine 13 drives a drum 50 that is mounted in a laundry appliance 51 such that it can rotate. The winding sections 14, 15, and 16 of the asynchronous motor are connected to one another in a so-called star circuit. Other circuit embodiments of the winding phases, such as a so-called delta circuit, are likewise possible.

The frequency converter circuit 3 is combined in an assembly and, in order to form a so-called DC voltage intermediate circuit, contains at least one rectifier circuit 2, which is connected on the output side to a power stage 12. The frequency converter circuit 3 contains a microcontroller 5, the at least one analog/digital signal converter 6 and 8, so-called A/D converters, digital outputs 9, which are connected to a so-called driver stage 10, and a memory device 7. On the input side, the rectifier circuit 2 is connected to a signal-phase mains filter 1. In this exemplary embodiment, the mains filter 1 is in the form of a component that is separate from the frequency converter circuit, although individual components of the mains filter 1 may also be integrated in the frequency converter circuit 3.

Furthermore, the frequency converter circuit 3 contains a voltage divider 4, which, in conjunction with the A/D converter 6, represents a voltage measurement device, and a so-called shunt resistance 11, which is used in conjunction with the A/D converter 8 as a current measurement device. A time measurement device can be represented in conjunction with a corresponding sequence controller by the microcontroller 5, because the microcontroller 5 has devices for production of a time clock, and for evaluation of events and interrupts.

On the output side, the driver stage 10 is connected to the high-power transistors (so-called IGBTs, Insulated Gate Bipolar Transistors) T1 to T6 in the power stage 12. The IGBTs T1 to T6 can be switched individually by using a device in the microcontroller 5 and by using the driver stage 10, thus making it possible to produce a pulse-width modulated voltage pulse or a pulse-width modulated voltage pulse sequence of various polarity in the phases uv, uw and vw, which are each formed by connecting two outputs u and v, u and w, or v and w of the frequency converter circuit 3. In this case, each voltage pulse has the voltage $U_{zwk}$ of the DC voltage intermediate circuit, and the root mean square voltage of the voltage pulse sequence results from the times for which the individual voltage pulses and the intermediate circuit voltage $U_{zwk}$ are switched on and off.

The outputs u, v, and w of the frequency converter circuit 3 are connected to the winding phases 14, 15, and 16 of a stator in the asynchronous motor 13. The intermediate circuit voltage $U_{zwk}$, which is produced during operation of the frequency converter circuit 3, is determined by the voltage measurement device in the frequency converter circuit 3.

Figure 2:
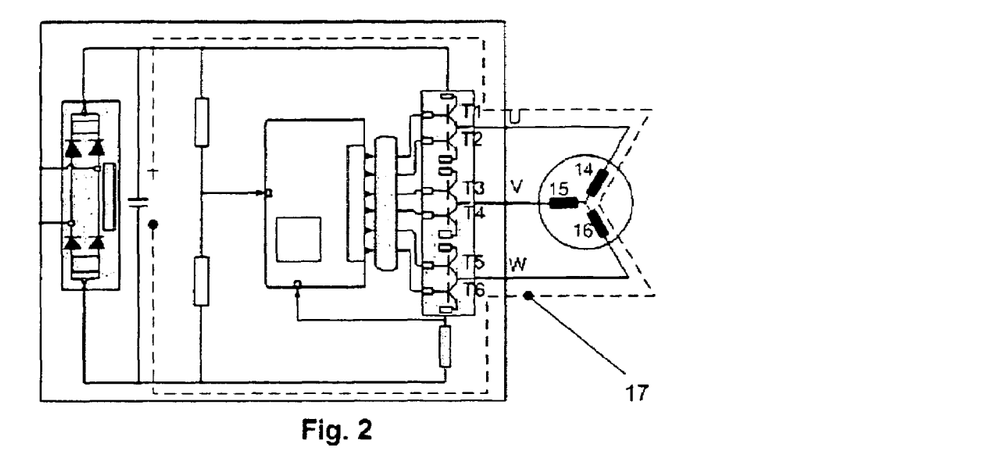
FIGS. 2-4 are schematic diagrams of a converter circuit emphasizing the respectively driven motor winding sections of the dynamo-electrical machine.
Figure 3:
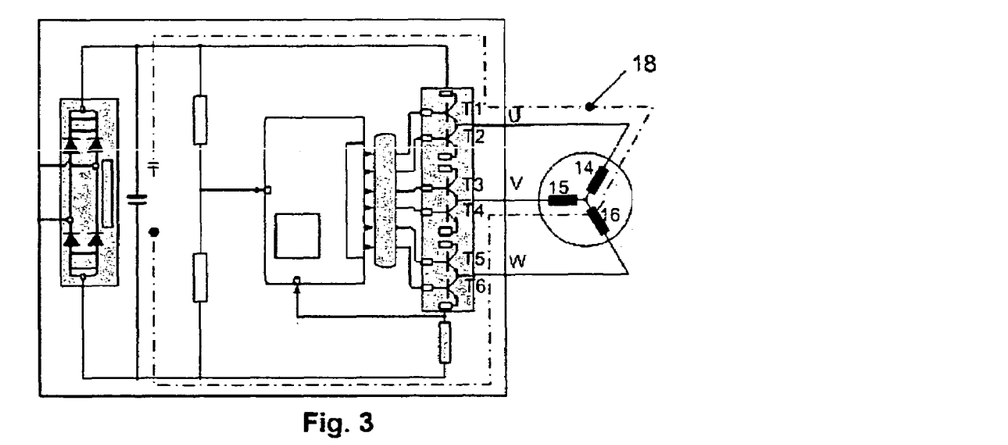
Figure 4:
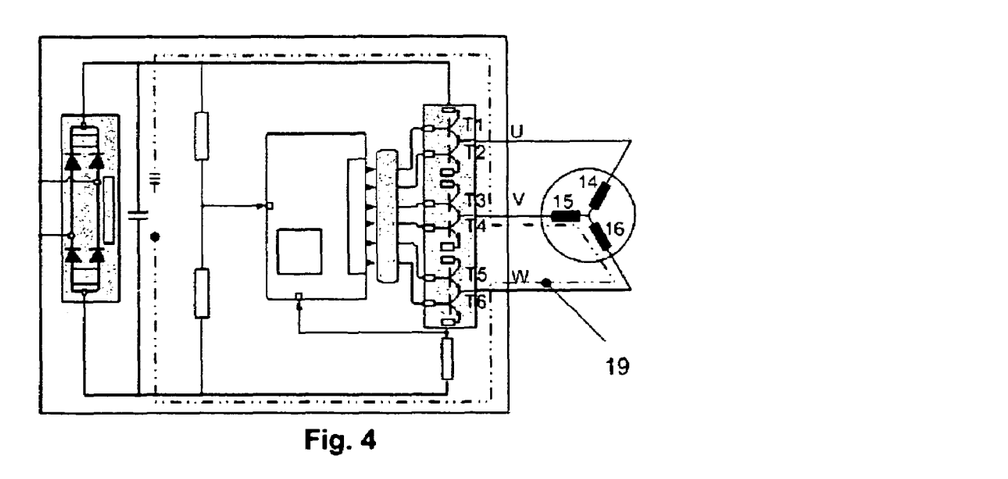

FIGS. 2 to 4 show the drive for the individual winding sections of the stator in the asynchronous motor 13, with the IGBTs T1 and T6 being switched on in order to drive a winding section that includes the winding phases 14 and 16, or the phase uw (current path 17). The current that is formed in the DC voltage intermediate circuit is determined by using the current measurement device in the frequency converter circuit 3.

In a corresponding manner, IGBTs T1 and T4 are switched on in order to drive the winding section that includes the winding phases 14 and 15, or the phase uv (current path 18), and the IGBTs T3 and T6 are switched on in a corresponding manner in order to drive the winding section, which includes the winding phases 15 and 16, or the phase vw (current path 19). The current that is formed when these winding sections are driven is also determined by using the current measurement device in the frequency converter circuit 3. In order to drive the winding sections with an opposite voltage polarity or current direction, the IGBTs T2 and T5 are switched on instead of the IGBTs T1 and T6, the IGBTs T2 and T3 are switched on instead of the IGBTs T1 and T4, and the IGBTs T4 and T5 are switched on instead of the IGBTs T3 and T6.

Voltage pulse sequences are produced by using a suitable sequence, which is known from the prior art, for driving the IGBTs, of the type that produces a magnetic rotating field in the asynchronous motor 13. As a result of the magnetic rotating field, a voltage is induced in short-circuited winding phases of the rotor of the asynchronous machine 13, a magnetic field is produced in the rotor and, in the end, this causes the rotor to rotate. The rotation direction of the rotor depends on the respective current direction in the winding sections of the stator of the asynchronous motor 13.

Before a sequence of voltage pulse sequences is produced by the frequency converter circuit 3 in the phases uv, uw, vw in order to produce a rotating field in the asynchronous motor 13, time and electrical parameters for the asynchronous motor 13 are determined. The electrical parameters are selected to select the variant of the connected asynchronous motor 13 and thus to select the open-loop and closed-loop control parameters associated with that variant, and to match the open-loop and closed-loop control parameters to the instantaneous operating state of the asynchronous motor 13. Alternatively, the electrical parameters can be selected to identify a motor malfunction or a motor fault, in order that subsequent driving of the asynchronous motor 13 can be prevented. For this purpose, in a first step, a voltage pulse sequence 20 or 24 is produced in the phase uw or in the winding phases 14 and 16 of the asynchronous motor 13 by using the power stage 12 in conjunction with the microcontroller 5 and the driver stage 10, by switching the IGBTs T1 and T6 in the power stage on and off simultaneously. Because the other IGBTs remain switched off, no rotating field is produced in the asynchronous motor 13 during the production of the voltage pulse sequence 20 or 24, so that the rotor of the asynchronous motor 13 does not rotate either.

Figure 5:
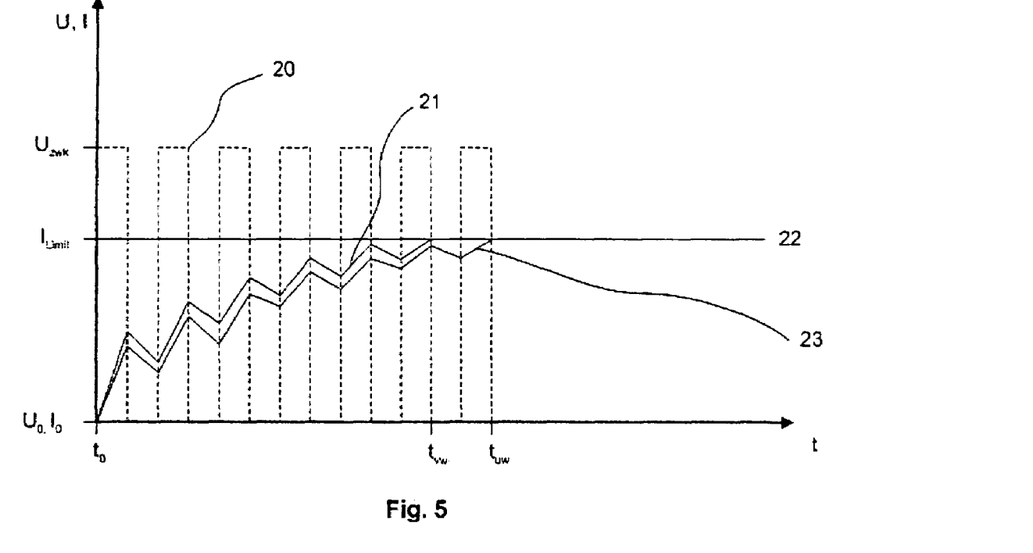
FIG. 5 is a graph plotting the current and voltage for driving a motor winding section versus time in order to determine a time parameter of the dynamo-electrical machine.

The voltage pulses in the voltage pulse sequence 20 result in a current 23 in the winding phases 14 and 16. A time current profile such as this is illustrated in FIG. 5. In this case, the time current profile 23 is governed predominantly by the inductance of the driven winding phases 14 and 16. The current level rises during a voltage pulse or during a phase in which the IGBTs T1 and T6 are switched on, and falls slightly between two voltage pulses or during the switched-off phases, with the rise being more pronounced than the fall. Because the rotor of the asynchronous machine 13 is not caused to rotate when the winding sections 14 and 16 are driven in this way, no so-called back e.m.f. is advantageously induced in the winding phases 14 and 16. The current profile 23 is thus not influenced by the back e.m.f. A drive type such as this is therefore actually suitable for determination of a time and/or electrical parameter for the asynchronous motor 13, which is determined in a further step by using the time measurement device in the microcontroller 5, by using the current and/or voltage measurement device in the frequency converter circuit 3.

A step such as this for determination of a parameter for the asynchronous motor 13 includes a step in which the current that is formed in the phase uw is measured by using the current measurement device in the frequency converter circuit 3. The measured current is continuously compared with the predetermined current limit value $I_{Limit}$, which is stored in the memory device 7 in the microcontroller. The comparison device that is required for this purpose is an integral component of the microcontroller 5. In a further step, the time period from the start $t_0$ of production of the voltage pulse sequence to the time $t_{uw}$ at which the current that is formed in the phase uw reaches the predetermined current limit value $I_{Limit}$ is determined by using the time measurement device in the frequency converter circuit 3 or in the microcontroller 5.

The time period ($t_{uw}$-$t_0$) is stored in the memory device 7 in the microcontroller 5, and represents a time parameter for the winding section of the winding phases 14 and 16 of the asynchronous motor 13.

An association table having a number of inductance values and respectively associated predetermined time codes is stored in the memory device 7 in the microcontroller 5. The time period ($t_{uw}$-$t_0$) determined for the driven winding section with the winding phases 14 and 16 is compared in a subsequent step with the predetermined time periods, and a time period that is closest to the measured time period is determined from the predetermined time periods. The value of the inductance of the driven winding section is obtained from the association table corresponding to the predetermined time period and the value of the inductance, and the value of the inductance is stored in the memory device 7. An inductance such as this represents an electrical parameter of the driven winding section or of the asynchronous motor 13.

Figure 6:
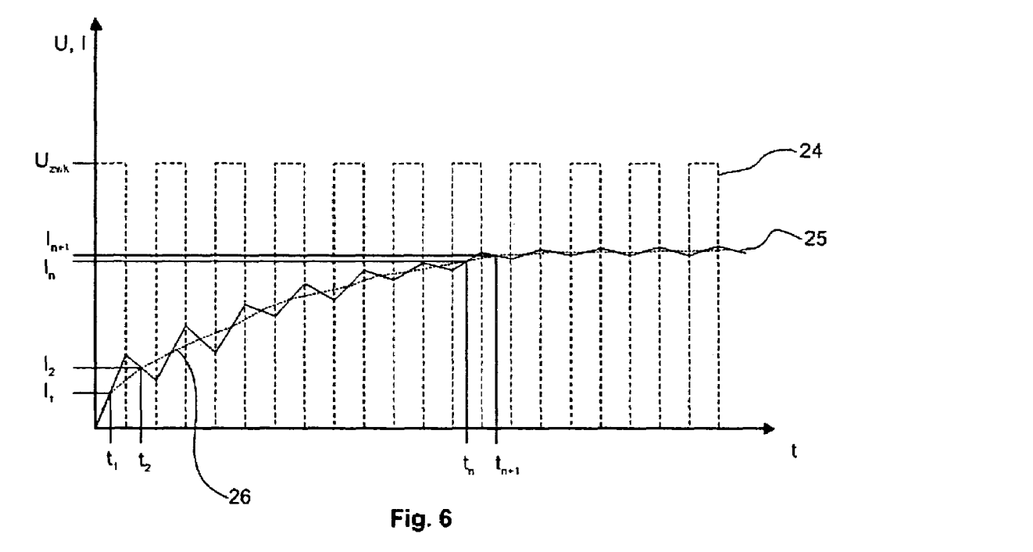
FIG. 6 is a graph plotting the current and voltage for driving a motor winding section versus time in order to determine an electrical parameter of the dynamo-electrical machine.

In an alternative refinement of the exemplary embodiment, in order to determine a further electrical parameter for the driven winding section of the winding phases 14 and 16 or of the asynchronous motor 13, the method has a step in which a voltage pulse sequence 24 is produced in the phase uw by using the power stage 12 in conjunction with the microcontroller 5 and the driver stage 10, in which the IGBTs T1 and T6 in the power stage are switched on and off at the same time. The other IGBTs remain switched off, so that no rotating field is produced in the asynchronous motor 13 during production of the voltage pulse sequence 24. The time current profile 25 that is formed during the production of the voltage pulse sequence 24 is illustrated in FIG. 6. As in the case of the previous exemplary embodiment as well, the voltage pulse sequence 24 is produced before a rotating field is produced in any other way in the asynchronous motor 13 by the frequency converter circuit 13. During the production of the voltage pulse sequence 24, the root mean square voltage $U_{rms}$ that is produced by the power stage 12 in the frequency converter circuit 3 is determined in a further step by measuring the voltage of the DC voltage intermediate circuit $U_{zwk}$ by using the voltage measurement device in the frequency converter circuit 3, and by measuring the times for which the voltage pulses are switched on $dt_{on}$ and/or off $dt_{off}$ by using the time measurement device in the microcontroller 5. The root mean square voltage $U_{rms}$ is then calculated by the microcontroller 5 using the following formula:

$$U_{rms} = U_{zwk} * \frac{dt_{on}}{dt_{on} + dt_{off}}$$

The current that is formed in the phase uw, or in the driven winding section, is measured in a subsequent method step by using the current measurement device 7 in the frequency converter circuit 3, and is averaged by using a device in the microcontroller 5. In a further step, the change in the mean current $\Delta I$ is calculated on the basis of two respectively successive mean current values $I_n$ and $I_{n+1}$, which were determined at the timed $t_n$ and $t_{n+1}$, using the expression:

$$\Delta I = \frac{I_{n+1} - I_n}{t_{n+1} - t_n}$$

In a further step, a maximum current value $I_{max}$ of the current profile 25 is determined, at which the current that is formed in the phase uw no longer changes. For this purpose, the value of the change in the current $\Delta I$ is continuously compared with the predetermined limit value, which is stored in the memory device 7 in the microcontroller 5, by using a device in the microcontroller 5, until the change in the current $\Delta I$ falls below the predetermined limit value. The last determined mean current value $I_{n+1}$ indicates the maximum current value $I_{max}$.

The resistance R of the driven winding section is calculated in a subsequent step by using a device in the microcontroller 5 from the root mean square voltage $U_{rms}$ and the maximum current value $I_{max}$ using the following rule:

$$R = \frac{U_{rms}}{I_{max}}$$

The calculated resistance R is an electrical parameter of the winding section with the winding phases 14 and 16, or of the asynchronous motor 13, and is stored in the memory device 7 in the microcontroller 5.

Once the time and electrical parameters of a winding section of the asynchronous motor 13 have been determined, the steps described above are repeated, with a voltage pulse sequence being produced in a first repetition by using the power stage 12 in the phase uv or in the winding phases 14 and 15 of the asynchronous motor 13, in which the IGBTs T1 and T4 in the power stage are switched on an off at the same time and the other IGBTs are switched off. In a second repetition of all of the preceding steps, a voltage pulse sequence is produced by using the power stage 12 in the phase vw or in the winding sections 15 and 16 of the asynchronous motor 13, in which the IGBTs T3 and T6 in the power stage are switched on and off at the same time, and each of the other IGBTs are once again switched off. Each repetition includes the previous steps for determination of a time and electrical parameter of the respective driven winding section. These parameters are stored, once they have been determined in the memory device 7 in the microcontroller 5. Time and electrical parameters are thus determined for each winding section of the asynchronous motor 13. In a subsequent step, the corresponding time and electrical parameters of the winding phases 14, 15, and 16 also can be calculated by using a device in the microcontroller 5 using the equation system from the time and electrical parameters for the winding sections. If the winding phases in the three-pole asynchronous motor 3 are connected to one another in delta, there is no need for the step for calculation of the parameters of the winding phases, since in this case a winding section corresponds to a winding phase.

A further association table having a number of open-loop and closed-loop control parameter steps and respectively associated predetermined time and/or electrical parameter sets is stored in the memory device 7 in the microcontroller 5, with one predetermined time and/or electrical parameter set in each case determining one design variant of an asynchronous motor 13. In a further method step in order to determine the design variant, a previously determined time or electrical parameter for the asynchronous motor 13 is compared with the predetermined parameter sets by using a comparator device in the microcontroller 5, and the closest predetermined parameter set is defined, with the time or electrical parameters for the asynchronous motor 13 corresponding to the time or electrical parameters of a winding section or averaged values of the time or electrical parameters of all the driven winding sections. The design variant of the driven winding section is obtained in the following step from the association table corresponding to the predetermined parameter set, and in open-loop and closed-loop control parameter set that is associated with that variant of the asynchronous motor 13 is thus also selected, and is used for the further open-loop and/or closed-loop control of the asynchronous motor 13.

In a further step, a previously measured and stored time or electrical parameter for the winding section is compared with an upper and a lower limit value associated with the respective type of parameter, that is, it is compared with an associated tolerance value band for, for example, permissible induction values or permissible resistance values for a winding section, by using a comparison device in the microcontroller 5. The associated limit values are read from the memory device 7 by a device in the microcontroller 5 as a function of the previously identified variant of the asynchronous motor. In a subsequent step, the comparison device outputs a fault value that indicates that the time or electrical parameter is outside its associated tolerance value band. The fault value is used to trace a machine fault, an unsuitable operating state of the asynchronous motor 13, or an unsuitable operating state of the connected frequency converter circuit 3. An operating state such as this occurs, for example, in the event of a turns short, a winding short or a short-circuit in the winding section, in the respective connecting lines or in the power stage 12. The comparison of a time or electrical parameter with an associated limit value is repeated for each winding section with one time or electrical parameter of a further winding section in each case being compared, in each repetition, with the same upper and lower associated limit value. All of the winding sections and winding phases 14, 15, and 16 of the asynchronous motor 13 can thus be checked for the presence of a machine fault.

A machine fault is present when the parameters of the various winding sections and winding phases 14, 15, and 16 differ excessively from one another, that is to say so-called asymmetry is present. FIG. 5 illustrates a situation such as this, in which, by way of example, a further time current profile 21 for the phase vw differs from the current profile 23 for the phase uw with the current profile 21 being produced by the voltage pulse sequence 20 when the winding section including the winding phases 15 and 16 is being driven. An alternative step for determination of a machine fault is thus possible, in which a time or electrical parameter of the first winding section is compared with a previously determined time or electrical parameter of a second winding section by the comparison device in the microcontroller 5. In a situation such as this, the time or electrical parameter of the first winding section defines a tolerance value band with an upper and a lower limit value, with the limit values being obtained from the magnitude discrepancy associated with the parameters of the first winding section.

The time or electrical parameters for the asynchronous motor 13 as well as any possible fault are determined in accordance with the above steps before each occasion on which the asynchronous motor 13 is driven correctly, in order to produce a rotating field. This process is repeated continuously, so that the fault value can be reset in the event of an only temporary fault, provided that the time or electrical parameters for the asynchronous motor 13 are within the respectively associated tolerance value band.

In a subsequent step, a disconnection device in the microcontroller 5 prevents the emission of a voltage pulse sequence or a sequence of a voltage pulse sequence from the power stage 12 in order to form a rotating field in the asynchronous motor 13, in that the disconnection device causes the digital outputs 9 to be reset when a fault has been found in a previous step. The resetting of the digital outputs 9 also results in the IGBTs T1 to T6 in the power stage 12 being switched off and remaining switched off as long as a fault is present.

In a further step, the voltage pulse sequence for production of a rotating field in the asynchronous motor is determined by using a device in the microcontroller 5 as a function of a time and/or electrical parameter for the asynchronous motor 13. For this purpose, the open-loop and closed-loop control parameters that were selected in a previous step and are dependent on the time and/or electrical parameter are used for this purpose. In an alternative refinement, a mathematical motor model or machine model can also be stored in the memory device 7. Using the electrical parameters in particular, the open-loop and closed-loop control parameters and/or the voltage pulse sequence are/is calculated in an embodiment such as this by using devices in the microcontroller 5, by using the mathematical motor model.

Furthermore, a predetermined maximum permissible operating temperature value for the asynchronous motor is stored in the memory device 7. In a subsequent step, an operating temperature value to be expected in the asynchronous motor 13 is calculated by using a device in the microcontroller 5, using a further mathematical motor model and the voltage pulse sequence determined in the previous step. The calculated operating temperature is compared with the predetermined operating temperature by using a comparison device in the microcontroller 5. If the comparison device indicates that the predetermined operating temperature value has been exceeded, then the steps for determination of the voltage pulse sequence and comparison for the predetermined operating temperature being exceeded are repeated until the operating temperature value to be expected is less than or equal to the predetermined operating temperature value. In an iterative process such as this for determination of the voltage pulse sequence, the magnitude of the overshoot is also taken into account in a next iteration step of the mathematical motor model for determination of the voltage pulse sequence. In an alternative refinement, equivalent association tables may also be stored in the memory device 7, in conjunction with defined computation rules, instead of the mathematical motor models.

The converter circuit 3 in the exemplary embodiment has a sequence controller that controls the method steps described above. This sequence controller is integrated in the microcontroller 5. p Furthermore, this converter circuit 3 is used together with the sequence controller to control the above method steps and to control a dynamo-electrical machine 13 or an synchronous motor 13 that drives a drum 50 that is mounted in the laundry appliance 51 such that it can rotate. The laundry appliance 51 is preferably a domestic washing machine or a domestic washer/drier.

In the advantageous exemplary embodiment, the converter device 3 is in the form of a frequency converter circuit 3 that controls an asynchronous motor 13. The method according to the invention is also suitable for alternative embodiments. For example, the converter circuit may also be in the form of a so-called current converter or direct converter. In the same way, the method and the converter circuit 3 are suitable for operation of polyphase electronically commutated motors, synchronous motors, so-called switched reluctance motors, or motors with permanent magnet excitation.

In the exemplary embodiment, the converter circuit 3 has a microcontroller 5 with an integrated memory device 7. In alternative refinements, the converter circuit 3 may also have a so-called digital signal processor 5 or two or more individual controllers or processors. In this case, the devices in the microcontroller 5, for example the memory device, the comparison device or A/D converters, may be provided in separate converter circuit assemblies, which communicate with one another.

We claim:

1. A method for operating a dynamo-electrical machine, comprising:
   a) driving a pair of winding sections of the dynamo-electrical machine by one or more voltage pulses produced by a power stage in a converter circuit, wherein the power stage includes a first transistor connected to a first winding section and a second transistor connected to a second winding section, wherein the voltage pulses are produced by switching the first and second transistors on and off simultaneously, the voltage pulses not producing a rotating field in the dynamo-electrical machine; and
   b) determining a parameter for the dynamo-electrical machine with a current measurement device in the converter circuit in conjunction with a time detection device and at least one converter for detecting at least one of a current and a voltage, while driving the dynamo-electrical machine, wherein act b) further comprises the acts:
   b1) measuring a current formed while driving the pair winding sections using the current measurement device in the converter circuit, and
   b2) determining a time period starting with the driving step and ending when the measured current substantially equals a predetermined current value by using the time measurement device in the converter circuit, the time period being a time parameter for the dynamo-electrical machine.

2. The method according to claim 1, which further comprises: using an inductance of the driven one of the winding sections as the parameter; and correlating the inductance of the driven one of the winding sections to the time parameter by using the converter circuit.

3. The method according to claim 2, wherein the correlating is performed using an association table.

4. The method according to claim 2, wherein the correlating is performed using a mathematic machine model.

5. The method according to claim 2, which further comprises: including a microcontroller in the converter circuit; and determining, with the microcontroller, the inductance of the driven one of the winding sections.

6. The method according to claim 2, which further comprises: including a signal processor in the converter circuit; and determining, with the signal processor, the inductance of the driven one of the winding sections.

7. A method for operating a converter circuit for controlling at least two winding sections of a polyphase dynamo-electrical machine while determining at least one parameter of the dynamo-electrical machine, the method comprising:
   a) producing, with a power stage in the converter circuit, at least one voltage pulse for driving one of the winding sections of the dynamo-electrical machine, while not producing any rotating field in the dynamo-electrical machine with the at least one voltage pulse; and
   b) while driving the dynamo-electrical machine, determining a parameter for the dynamo-electrical machine with a measurement device in the converter circuit in conjunction with a time detection device and at least one converter for detecting at least one of a current and a voltage, wherein the measurement device in the converter circuit is a current measurement device, wherein act b) further comprises the following acts:
   b1) while driving at least one of the winding sections in the power state, measuring a current formed by using the current measurement device in the converter circuit,
   b2) determining a time period starting with the driving step and ending with a predetermined current value being reached by using the time measurement device in the converter circuit, the time period being a time parameter for the dynamo-electrical machine;
   b3) determining a root mean square voltage produced while the at least one winding section is being driven by the power stage in the converter circuit by using at least one of the time detection device and a voltage measurement device in the converter circuit to determine time periods when the at least one voltage pulse is switched on;
   b4) measuring a current flowing while the power stage in the converter circuit drives the winding section by using the current measurement device in the converter circuit;
   b5) determining a time change in the current while the winding section is being driven by the converter circuit;
   b6) determining a maximum current value occurring when the change in the current falls below a predetermined limit value; and
   b7) determining a resistance of the driven winding section resulting from the root mean square voltage and from the maximum current, the resistance of the driven winding section being an electrical parameter of the dynamo-electrical machine.

8. The method according to claim 7, which further comprises:
   including a microcontroller in the converter circuit;
   and determining the root mean square voltage with the microcontroller;
   determining the time change in the current with the microcontroller;
   determining the maximum current value with the microcontroller;
   and determining the resistance of the driven winding section with the microcontroller.

9. The method according to claim 7, which further comprises:
   including a signal processor in the converter circuit;
   determining the root mean square voltage with the signal processor;
   determining the time change in the current with the signal processor;
   determining the maximum current value with the signal processor;
   and determining the resistance of the driven winding section with the signal processor.

10. A method for operating a dynamo-electrical machine, comprising:
   a) driving a pair of winding sections of the dynamo-electrical machine by one or more voltage pulses produced by a power stage in a converter circuit, wherein the power stage includes a first transistor connected to a first winding section and a second transistor connected to a second winding section. wherein the voltage pulses are produced by switching the first and second transistors on and off simultaneously, the voltage pulses not producing a rotating field in the dynamo-electrical machine; and b) determining a parameter for the dynamo-electrical machine with a measurement device in the converter circuit in conjunction with a time detection device and at least one converter for detecting at least one of a current and a voltage, while driving the dynamo-electrical machine;

c) comparing the parameter of the dynamo-electrical machine with a number of predetermined parameter values by using a comparison device in the converter circuit, the predetermined parameter values being associated with different variants of the dynamo-electrical machine;

d) determining a variant of the dynamo-electrical machine using the comparison device; and e) selecting control parameters associated with the variant.

11. The method according to claim 10, wherein at least one of the parameters includes a time parameter.

12. The method according to claim 10, wherein the parameters include an electrical parameter.

13. The method according to claim 11, which further comprises using a microcontroller as the comparison device.

14. The method according to claim 10, which further comprises using a signal processor as the comparison device.

15. The method according to claim 10, which further comprises including closed-loop control parameters in the control parameters associated with the variant.

16. The method according to claim 10, which further comprises including open-loop control parameters in the control parameters associated with the variant.

17. A method for operating a dynamo-electrical machine, comprising:

a) driving a pair of winding sections of the dynamo-electrical machine by one or more voltage pulses produced by a power stage in a converter circuit, wherein the power stage includes a first transistor connected to a first winding section and a second transistor connected to a second winding section, wherein the voltage pulses are produced by switching the first and second transistors on and off simultaneously, the voltage pulses not producing a rotating field in the dynamo-electrical machine; and b) determining a parameter for the dynamo-electrical machine with a measurement device in the converter circuit in conjunction with a time detection device and at least one converter for detecting at least one of a current and a voltage, while driving the dynamo-electrical machine;

c) comparing the parameter of the dynamo-electrical machine with a tolerance value band using a comparison device in the converter circuit, the tolerance value band being associated with the respective parameter; and d) determining a fault of at least one of the dynamo-electrical machine and the connected converter circuit when the parameter is outside the respective tolerance value band.

18. The method according to claim 17, wherein the parameter includes a time parameter.

19. The method according to claim 17, wherein the parameter includes an electrical parameter.

20. The method according to claim 17, which further comprises:
using a microcontroller as the comparison device; determining the fault of at least one of the dynamo-electrical machine and the connected converter circuit by using the microcontroller.

21. The method according to claim 17, which further comprises:
using a signal processor as the comparison device; and determining the fault of at least one of the dynamo-electrical machine and the connected converter circuit by using the signal processor.

22. The method according to claim 17, wherein the fault is a mechanical fault.

23. The method according to claim 22, wherein the fault is a turns short in the respectively driven winding section.

24. The method according to claim 22, wherein the fault is a ground short in the respectively driven winding section.

25. The method according to claim 21, wherein the fault is an unsuitable operating state.

26. The method according to claim 17, which further comprises, preventing an output of a voltage pulse sequence from the power section of the converter switches to form a rotating field in the dynamo-electrical machine when one of the faults is present, by using a disconnection device in the converter circuit.

27. The method according to claim 26, which further comprises using a microcontroller as the disconnection device.

28. The method according to claim 26, which further comprises using a signal processor in the converter circuit.

29. A method for operating a dynamo-electrical machine, comprising:

a) driving a pair of winding sections of the dynamo-electrical machine by one or more voltage pulses produced by a power stage in a converter circuit, wherein the power stage includes a first transistor connected to a first winding section and a second transistor connected to a second winding section, wherein the voltage pulses are produced by switching the first and second transistors on and off simultaneously, the voltage pulses not producing a rotating field in the dynamo-electrical machine; and b) determining a parameter for the dynamo-electrical machine with a measurement device in the converter circuit in conjunction with a time detection device and at least one converter for detecting at least one of a current and a voltage, while driving the dynamo-electrical machine;

c) determining a voltage pulse sequence for producing a rotating field in the dynamo-electrical machine, by using a device in the converter circuit to correlate the voltage pulse sequence with the parameter.

30. The method according to claim 29, which further comprises using a microcontroller as the device in the converter circuit.

31. The method according to claim 29, which further comprises using a signal processor as the device in the converter circuit.

32. The method according to claim 29, which further comprises correlating the voltage pulse sequence by using an association table.

33. The method according to claim 29, which further comprises correlating the voltage pulse sequence using a mathematical machine model.

34. The method according to claim 29, wherein the parameter is an inductance of the winding sections.

35. The method according to claim 29, which further comprises, determining the voltage pulse sequence by using the device in the converter circuit to correlate the voltage pulse sequence to a predetermined operating temperature value of the dynamo-electrical machine.

36. The method according to claim 35, which further comprises using an association table to correlate the voltage pulse sequence.

37. The method according to claim 35, which further comprises using a mathematical machine model to correlate the voltage pulse sequence.

38. A laundry appliance, comprising:
a rotatable drum;
a polyphase dynamo-electrical machine driving said rotatable drum; and
a converter circuit controlling said polyphase dynamo-electrical machine and including
  a power stage for producing voltage pulses for driving the polyphase dynamo-electrical machine, wherein the power stage includes a first transistor connected with a first winding section and a second transistor connected with a second winding section, wherein a voltage pulse can be produced by switching the first and second transistors on and off simultaneously without producing a rotating field in the dynamo-electrical machine;
  a measurement device for measuring electrical output variables of the converter circuit;
  a device for determining a parameter of the dynamo-electrical machine using the measurement device in conjunction with a time detection device and at least one converter for detecting at least one of a current and a voltage, while driving the dynamo-electrical machine; and
  a controller, the controller determining at least one of an operating parameter and a fault condition based on the parameter.

39. The laundry appliance of claim 38, wherein the operating parameter includes open-loop control parameters.

40. The laundry appliance of claim 38, wherein the operating parameter includes closed-loop control parameters.

41. The laundry appliance of claim 38, wherein the operating parameter includes an operating voltage pulse sequence.

42. The laundry appliance of claim 38, wherein the fault condition is an out of tolerance range fault.

43. The laundry appliance of claim 38, wherein the fault condition is an asymmetry condition.

* * * * *